United States Patent Office 3,832,319
Patented Aug. 27, 1974

3,832,319
PROCESS AND COMPOSITION FOR STABILIZING SILICONE RESINS IN SOLUTIONS
Duane F. Merrill, Ballston Spa, N.Y., assignor to General Electric Company
No Drawing. Filed Aug. 10, 1972, Ser. No. 279,525
Int. Cl. C08g 51/36
U.S. Cl. 260—31.2 R     18 Claims

ABSTRACT OF THE DISCLOSURE

A process for stabilizing a solution of a silicone resin comprising adding to said solution 5 to 20% based on the weight of the resin solids of a stabilizing additive of the formula, $$R^{10}OGOH$$

wherein in the above formula, $R^{10}$ is selected from monovalent hydrocarbon radicals and halogenated monovalent hydrocarbon radicals and G is selected from divalent hydrocarbon radicals. The most preferred stabilizing additive is butyl Cellosolve.

BACKGROUND OF THE INVENTION

The present invention relates to a process for stabilizing silicone resins in solution and more particularly the present invention relates to a stabilizing additive that can be added to solutions of silicone resins so as to make the resulting solution shelf stable for a prolonged period of time.

At the present time, there are some silicone resins shipped to manufacturing plants and other industrial entities in the form of dry solids, wherein the manufacturer takes the dry solids and mixes it with various components so as to utilize the silicone resin for the purpose that he desires. However, at the present time as well as prior to the instant case, it was desired in many cases to ship silicone resins in the form of solutions. This is particularly true where the silicone resin was to be used to form coatings or laminates on various substrates. Thus, the manufacturer could receive the solution of the silicone resin at the desired solids concentration and utilize such a silicone resin solution immediately without any further preparatory steps. In some cases industrial entities that utilize silicone resins prefer that such silicone resins be shipped to them not only in the solution but further with a curing catalyst already in solution. The advantage of such shipments of catalyzed silicone resin solutions was the fact that the manufacturing entity that utilized them for coating purposes could apply the solution immediately without any formulation steps.

It was early discovered that such silicone resin solutions and particularly the ones having the catalyst therein had an undesirably short shelf life, that is, such silicone resin solutions would tend to gel after a short period of time such as 1 to 2 months and in some cases would even gel in a period as short as 1 week after the solution had been prepared.

Accordingly, investigators in the field decided to find a stabilizing additive that could be added to solutions so as to stabilize the silicone resin even in the presence of a catalyst and prevent the gelling of the catalyzed or uncatalyzed silicone resin solution for periods of time as long as 6 months or more.

Some stabilizing agents that were found to be somewhat usable were lower aliphatic alcohols. However, the utilization of such lower aliphatic alcohols or stabilizing agents in solutions of silicone resins were found to be undesirable in that the alcohol lowered the resin viscosity and the silicone resin solution viscosity which made the solution difficult to apply upon the substrates which were to be coated.

In addition, the use of such lower aliphatic alcohols were found to inhibit the cure of the solution when such silicone resin solutions were heated to elevated temperatures.

However, the greatest disadvantage with the use of lower aliphatic alcohol as stabilizing agents for silicone resin solutions was the fact that this stabilizing agent degraded or deleteriously affected the resulting physical properties of the final cured silicone resin coating or film that was formed on the desired substrate.

Accordingly, it is desirable to discover a suitable stabilizing additive for silicone resin solutions whether they be catalyzed or uncatalyzed and which will stabilize and prevent the gelling of the silicone resin solution for periods as long as six months or more.

Thus, it is one object of the present invention to provide a silicone resin solution having therein a stabilizing additive which will prevent the gelling of the solution for periods as long as six months or more, whether the solution contains a catalyst or does not contain a catalyst.

It is another object of the present invention to provide a process for stabilizing silicone resin solutions whether they be catalyzed or uncatalyzed for periods as long as six months or more.

It is another object of the present invention to provide a stabilizing additive for silicone resin solutions whether they be catalyzed or uncatalyzed and which additive will not deleteriously affect the physical properties of the final cured silicone resin film.

It is yet an additional object of the present invention to provide a stabilizing additive for silicone resin solutions whether they be catalyzed or uncatalyzed which stabilizing agent will not undesirably affect the viscosity of the silicone resin and the silicone resin solution.

It is still another object of the present invenion to provide stabilizing additive for silicone resin solutions whether they be catalyzed or uncatalyzed which stabilizing additive will not deleteriously inhibit the cure time of the silicone resin solution and more particularly the silicone resin when it is desired to cure it at elevated temperatures.

These and other objects of the present invention are accomplished by means of the invention set forth below.

SUMMARY OF THE INVENTION

In accordance with the above object there is provided in the present case a process for stabilizing a solution of a silicone resin comprising adding to said solution 5 to 20% by weight based on the weight of the silicone resin solids of a stabilizing additive of the formula, (1)     $R^{10}$ OGOH where $R^{10}$ is selected from the class consisting of monovalent hydrocarbon radicals and halogenated monovalent hydrocarbon radicals of up to 15 carbon atoms, G is selected from the class consisting of —$R^{11}$—,

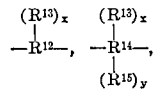

wherein $R^{11}$, $R^{12}$ and $R^{14}$ are selected from the class consisting of divalent hydrocarbon radicals, divalent hydrocarbonoxy hydrocarbon radicals and halogenated divalent hydrocarbon radicals of 1 to 20 carbon atoms, $R^{13}$, $R^{15}$ are selected from monovalent hydrocarbon radicals and halogenated hydrocarbon radicals of 1 to 8 carbon atoms and $x$, $y$ are whole numbers that vary from 1 to 5.

In the preferred embodiment of the present invention, $R^{10}$ is a lower alkyl radical of 1 to 8 carbon atoms and G is —$R^{11}$—, wherein this moiety is a lower alkenyl radical of 2 to 8 carbon atoms. The most preferred stabilizing additive within the scope of the above formula is butyl Cellosolve. The solvent that is used in such silicone resin solutions is selected from the class consisting of aromatic hydrocarbon solvents, aliphatic hydrocarbon solvents, ether solvents and ester solvents. Most preferably, the solvent is selected from the class consisting of benzene, toluene, xylene, butyl acetate, ethyl acetate and diethyl ether.

In such solution, the silicone resin may be present at a concentration that may vary from 5% to 95% by weight based on the weight of the solution. Of course, the solvent that is present in turn varies from a concentration of 5 to 95% by weight based on the weight of the solution. There may be also present in such a solution at a concentration of 0.1 to 10% by weight of the silicone resin of a metal salt catalyst since in some cases it is desired to have a metal salt catalyst present so that the solution can be used without any further formulation by the purchaser of said silicone resin solutions.

The stabilizing additive of the present case may be used in silicone resin solutions wherein the silicone resin is comprised of trifunctional and difunctional units and may also be used in cases where the silicone resin is comprised of monofunctional and tetrafunctional units. In addition, the stabilizing agent of the present invention may be utilized in the silicone resin solutions where the silicone resin is comprised of monofunctional units, tetrafunctional units and difunctional units. Preferably, the stabilizing agent additive of the present case is utilized in silicone resin solutions where the silicone resin is comprised of trifunctional and difunctional units, and in which the silicone resin may have a hydroxyl content that may vary anywhere from 0.5 to 12% by weight of the resin.

DESCRIPTION OF THE PREFERRED EMBODIMENT

In the above formula (1), $R^{10}$ and $R^{13}$ and $R^{15}$ can be, for example, arlkyl, mononuclear aryl such as, phenyl, benzyl, tolyl, xylyl and ethylphenyl; halogen-substituted mononuclear aryl such as, 2,6-dichlorophenyl, 4-bromophenyl, 2,5-difluorophenyl, 2,4,6-trichlorophenyl and 2,5-dibromophenyl; nitro-substituted mononuclear aryl such as, 4-nitrophenyl and 2,6-dinitrophenyl; alkoxy-substituted mononuclear aryl such as, 4-methoxyphenyl, 2,6-dimethoxyphenyl and 2-ethoxyphenyl; alkyl such as methyl, ethyl, n-propyl, isopropyl, n-butyl, sec-butyl, isobutyl, tertbutyl, amyl, hexyl, heptyl, and octyl; alkenyl such as, vinyl, allyl, n-butenyl-1, n-butenyl-2, n-pentenyl-2, n-hexenyl-2, 2,3-dimethylbutenyl-2, and n-heptenyl; alkynyl such as, propargyl and 2-butynyl; haloalkyl such as, chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, cloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3,-dichloropentyl, 3,3-dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,5,5-trichloroheptyl, 2,4-dichloromethylheptyl, chlorooctyl, bromooctyl, iodooctyl, 2-4-dichlorooctyl, 2,4,4-tricholoromethylpentyl, and 1,3,5-tribromooctyl; haloalkenyl such as, chlorovinyl, bromovinyl, chloroallyl, bromoallyl, 3-chloro-n-butenyl-1, 3-chloro-n-pentenyl-1, 3-fluoro-n-heptenyl-5, 1,3,3-trichloro-n-heptenyl-5, 1,3,5-trichloro-n-octenyl-6 and 2,3,3-trichloromethylpentenyl-4; haloalkynyl such as chloropropargyl and bromopropargyl; nitroalkyl such as, nitromethyl, nitroethyl, nitro-n-propyl, nitro-n-butyl, nitropentyl and 1,3-dinitroheptyl; nitroalkenyl such as, nitroallyl, 3-nitro-n-butenyl-1 and 3-nitro-n-heptenyl-1; nitroalkynyl such as, nitropropargyl; alkoxyalkyl and polyalkoxyalkyl such as, methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, methoxypentyl, methoxymethoxypentyl, methoxyheptyl and ethoxyethoxy; alkoxyalkenyl and polyalkoxyalkenyl such as, ethoxyvinyl, ethoxyallyl, butoxyallyl, and methoxy-n-butenyl-1; alkoxyalkynyl and polyalkoxyalkynyl such as, methoxy propargyl; cycloalkyl, cycloalkenyl and alkyl, halogen, alkoxy and nitro-substituted cycloalkyl and cycloalkenyl such as, cyclopentyl, cyclohexyl, cycloheptyl, cyclooctyl, 6-methylcyclohexyl, 3,4-dicholorocyclohexyl, 2,6-dibromocycloheptyl, 2-nitrocyclopentyl, 1-cyclopentenyl, 3-methyl-1-cyclopentenyl, 5-methoxy-n-cyclopentenyl, 3,4-dimethyl-1-cyclopentenyl, 2,5-dimethoxy-1-cyclopentenyl, 5-methyl-5-cyclopentenyl, 3,4-dichloro-5-cyclopentenyl, 2-nitro-1-cyclohexenyl, 1-cyclohexenyl, 3-methyl-1-cyclohexenyl and 6-methoxy-1-cyclohexenyl; and cyanoalkyl such as, cyanomethyl, cyanobutyl and cyanoisobutyl.

Thus, as indicated above, the radicals $R^{10}$ and $R^{13}$ and $R^{15}$ as defined above may be any of the monovalent halogenated monovalent hydrocarbon radicals indicated above. Generally, the $R^{10}$ radical may contain up to 15 carbon atoms and more preferably up to 8 carbon atoms. Thus, preferably, $R^{10}$ is a lower alkyl of 1 to 8 carbon atoms and most preferably butyl. Generally, the $R^{13}$ and $R^{15}$ radicals in the compounds of formula (I) are generally monovalent hydrocarbon radicals of 1 to 8 carbon atoms and most preferably lower alkyl radicals such as, methyl, ethyl, propyl of 1 to 8 carbon atoms.

The radicals represented by $R^{11}$, $R^{12}$, $R^{14}$ are divalent hydrocarbon radicals, divalent hydrocarboxyhydrocarbon radicals, or halogenated divalent hydrocarbon radicals of 1 to 20 carbon atoms and preferably such divalent hydrocarbon radicals are alkylene, alkyleneoxyalkylene, aryleneoxyarylene, or arylene radicals of from 1 to 20 carbon atoms such as, methylene, ethyleneoxyethylene, ethylene, phenylene, phenyleneoxyphenylene, various isomers of the phenylene radicals or substituted phenylene radicals. The $R^{12}$ and $R^{14}$ are to be distinguished from the $R^{11}$ in that in those cases, that is, in the case of $R^{12}$ and $R^{14}$, there are branch chained substituent groups attached to the divalent hydrocarbon radical. The divalent radical, $R^{11}$, does not have any branch chained radicals attached to it. In the most preferred embodiment, $R^{11}$, $R^{12}$ and $R^{14}$ are lower alkenyl radicals of 2 to 8 carbon atoms such as ethylene, propylene, butylene, etc. These Cellosolve compounds coming within the scope of formula (I) are well known compounds and may be easily manufactured. For instance, Cellosolve compounds are manufactured by Shell Chemical Company, and Dow Chemical Company.

The most preferred compounds within the scope of formula (I) are as follows:

Ethylene Glycol Monobutyl Ether
Ethylene Glycol Monoethyl Ether
Ethylene Glycol Monohexyl Ether
Diethylene Glycol Monomethyl Ether
Diethylene Glycol Monoethyl Ether
Diethylene Glycol Monobutyl Ether
Ethoxy Triethoxy Triethylene Glycol
Methoxy Triethylene Glycol It should also be noted that $x$ and $y$ in the compounds of formula (I) may vary from 1 to 5 and in the most preferred embodiment the values for $x$ and $y$ are 1 or 2, that is, there is 1 or 2 and at the most 4 branch chained radicals attached to the divalent hydrocarbon radicals, that is, the $R^{12}$ radicals or the $R^{14}$ radicals.

Preferably and generally, when a solution of a silicone resin is made up the silicone resin is present at a concentration of 5 to 95% by weight based on the total weight of the solution. Thus, in that case, then the solvent would be present at a concentration of 5% to 95% by weight. More particularly, the silicone resin is present at a concentration of 30 to 70% by weight based on the total weight of the solution and thus, in turn the solvent would be present at a concentration of 30% to 70% by weight. In any case, irrespective of the concentration of the silicone resin solids in solution the stabilizing additive of formula (I) above is utilized generally at a concentration of 5% by weight to 20% by weight based on the weight of the silicone resin solids in solution. If it is used at a concentration of less than 5% by weight then it does not have any stabilizing effect on the silicone resin. If it is used at a concentration of greater than 20% by weight of the silicone resin solids it is not found that it imparts any additional stabilizing effect to the silicone resin solds. Most preferably, the stabilizing additive of formula (I) is utilized at concentrations of 5 to 10% by weight based on the silicone resin solids in solution. In forming the solution, there may be utilized any of the well known inert hydrocarbon solvents in dissolving the silicone resin. The hydrocarbon solvent, of course, has to be inert and non-reactive with the silicone resin that is dissolved in it. Thus, the stabilizing additive of the present invention will operate and will stabilize the silicone resin irrespective of what the hydrocarbon solvent is as long as the hydrocarbon solvent is not particularly reactive to the silicone resin. As such, such solvents that fit this category are, of course, the well known inert hydrocarbon solvents. Thus, the solvent that is used in forming the solution with the silicone resin may be any of the well known aromatic hydrocarbon solvents, aliphatic hydrocarbon solvents, ether solvents and ester solvents. Thus, there may be utilized as a solvent in forming the solution of a silicone resin in which the stabilizing additive of formula (I) is utilized, solvents such as xylene, toluene, mineral spirits, benzene; ester solvents such as, butyl acetate, ethyl acetate, and etc.; ether solvents such as, diethylether and etc.; aliphatic hydrocarbon solvents such as heptane, octane; cyclic aliphatic hydrocarbon solvents such as cyclohexane and other well known hydrocarbon solvents which are utilized to dissolve silicone resins therein.

The other constituent of the solutions or stabilized solutions in which the stabilizing additive of formula (1) is utilized, is the silicone resin. As stated previously, generally the silicone resin may be present in solution at a concentration of 5 to 95% by weight of the solution or more preferably at a concentration of 30 to 70% by weight of the solution. At any rate, irrespective of the concentration of the silicone resin, the stabilizing additive is generally added at a concentration of 5 to 20% by weight of the silicone resin solids. The silicone resins that may be stabilized with a stabilizing additive of the present invention may be any known silicone resin, irrespective of whether the silicone resin is comprised of trifunctional units, difunctional units or is comprised of monofunctional units and tetrafunctional units or whether it is comprised of monofunctional units, tetrafunctional units and difunctional units. Thus, the stabilizing additive of the present invention is preferably utilized in silicone resin solutions containing therein $RSiO_{3/2}$ trifunctional units and $R_2SiO$ difunctional units where the R to Si ratio may vary from 1.0 to 1.9 and the silanol content of the resin may vary from 0.5 to 12% by weight. The radical R is selected from the class consisting of monovalent hydrocarbon radicals, halogenated monovalent hydrocarbon radicals and cyanoalkyl radicals. The various radicals that are represented by the R radical may be any of the radicals set forth in the definition of the $R^{10}$ radical. Preferably, the R radical in the above silicone resin is selected from lower alkyl radicals of 1 to 8 carbon atoms such as, methyl, ethyl, and mononuclear aryl radicals and substituted mononuclear aryl radicals such as, phenyl and etc.

Such a resin may be prepared in one instance by taking a silane blend consisting, for instance, of methyltrichlorosilane and phenyltrichlorosilane and in addition a necessary amount of dimethyldichlorosilane depending on the R to Si ratio desired in the final resin, and these chlorosilanes are taken and mixed or dissolved in the necessary amount of toluene. The resulting solutions of chlorosilanes and toluene is then added to water. Usually the organic solvent, chlorosilane blend is added to water over an extended period of time which may vary anywhere from 20 minutes to 1 hour so as to control the reaction temperature or hydrolysis temperature in the hydrolysis medium to below 90° C. The reason for controlling the reaction temperature or the hydrolysis temperature below 90° C. is to prevent the boiling off of the chlorosilane reactants. After the addition of the organic solvent solution of chlorosilanes to water is completed then additional solvent is preferably added so as to form two distinct phases and so as to facilitate the dissolving of the hydrolysis product in the organic solvent phase. Thus, after the additional organic solvent is added, the agitation may be continued for 15 to 30 minutes. Agitation is then stopped and the mixture is allowed to settle whereupon two phases are formed. The lower acid water layer is drawn off and discarded. Then the organic layer may be washed several times with water to remove any acid that may be present in the organic solvent layer. In addition, it is preferable to add some water after the washing step to the organic solvent layer in which case the water that is added acts as a stabilizer to the dissolved silicone resin. This water may then be removed by heating the resin to reflux and trapping off the water. Following the removal of the water then the resin may be equilibrated so as to further stabilize it by adding 1% by weight of acid treated clay such as, Filtrol #1. Then after the addition of the Filtrol #1, the organic solvent silicone resin layer is heated to above 170° C. and the solvent is stripped off. Preferably, this bodying of the resin, that is, the further stabilization of resin and the removal of some of the hydroxyl groups in the silicone resin takes place in 4 to 6 hours and this condensation and bodying step is watched in terms of the change in viscosity of the organic silicone resin solution. The refluxing is continued until the viscosity of the resulting silicone resin solution is about 400 to 600 centipoise as determined with Zahn cup viscometer. The resin is then cut with 16 parts of toluene and filtered through any well known filter material. At that point, then the additional organic solvent is added so that the final silicone resin solution contains 30 to 70% by weight of silicone resin solids in solution. The R to Si ratio of any resin produced in this manner is from 1.0 to 1.9 and the hydroxyl content of the resin as produced in accordance with the above process varies from 0.5 to 2% by weight.

Such a silicone resin, that is, the above defined silicone resin, composed of trifunctional units and difunctional units is not very stable in solution, particularly in the case where a metal soap catalyst is added to said solution. Accordingly, it has been found that the stabilizing additive of formula (1) is imminently suitable and acts as an excellent stabilizer for the above defined silicone resin when said stabilizing additive of formula (1) is added at the concentrations indicated above. Thus, it has been found that silicone resin solutions of a resin produced in accordance with the above process which solutions may or may not have a catalyst therein and which solutions are stabilized with the stabilizing additive of formula (1), that such solutions have shelf lives of 6 months or more.

As pointed out previously, the stabilizing additive of the present case is found to be useful even in the case of stable silicone resins containing trifunctional and difunctional units therein, that is, such a stabilizing additive is added to such stable silicone resins in solution when there is present a catalyst. Stable silicone resins when they are placed in solution and there is added a catalyst, such silicone resin solutions tend to gel, and to have a very short shelf life. However, it has been found that with the addition of the stabilizing additive of formula (1) in such solutions that the resulting solution will have a shelf life of 6 months or more without gelling.

One method for making a silicone resin which may be stable in solution without the presence of a catalyst but is unstable in solution in the presence of a catalyst is the silicone resin defined in the patent application of Duane F. Merrill, Ser. No. 115,715, filed Feb. 16, 1971. Thus, such resins as pointed out in the above-identified patent application are prepared by a process which comprises agitating a mixture comprising an organohalosilane, water, acetone and a water-immiscible organic solvent and optionally, an aliphatic monohydric alcohol having from 1 to 8 carbon atoms. There is present by weight in said mixture per part by weight of the organohalosilanes 1.7 to 10 parts of water, 0.2 to 5 parts of acetone and 0.3 to 5 parts of a water-immiscible organic solvent and finally optionally, from 0 to 1 mole of alcohol per mole of halogen attached to the organohalosilane reactant. Then after the addition is completed there is separated an organic solvent solution of hydrolyzed organohalosilanes from the resulting hydrolysis mixture. The organic solvent layer or the water-immiscible organic solvent layer which is separated contains a silanol-containing silicone resin having therein $RSiO_{3/2}$ trifunctional units and $R_2SiO$ difunctional units where the R to Si rato may vary from 1.0 to 1.9 and the hydroxyl content of the silicone resin may vary anywhere from 0.5 to 12% by weight and is generally present at a concentration of from 5.0 to 12% by weight of the silicone resin. The R radicals are defined in the same manner as the $R^{10}$ radicals in formula (1).

The organohalosilane reactants that are utilized in this process of Merrill's may be selected from organotrihalosilanes, a mixture of organotrihalosilanes and diorganodihalosilanes, the reaction product of an alcohol and a member selected from an organotrihalosilane or a mixture of organotrihalosilane and diorganodihalosilane or the organohalosilane mixture may comprise a mixture of an alkoxylated organohalosilane and either an organotrihalosilane or a mixture of organotrihalosilanes and diorganodihalosilanes. The various components of the hydrolysis mixture can be added concomitantly or separately in any desired order. Generally, the organohalosilane is added to the mixture of water, acetone, and organic solvent. Preferably, when this method is used a proportion of from 2 to 6 parts of water, 0.3 to 2 parts of acetone and 0.6 to 2 parts of organic solvent per part of organohalosilanes can be employed. It is preferred that the organohalosilane be added to the hydrolysis mixture rather than vice-versa as this limits the concentration of hydrochloric acid which is formed during the hydrolysis reaction. A strong hydrochloric acid solution is undesirable as the hydrochloric acid causes acid polymerization of the acetone forming polymerization products which add undesirable color to the product and have a deleterious effect on the physical properties of the product.

The preferred embodiment of the process of the present invention is the dual-feed process. The dual-feed process comprises feeding the organohalosilane reactants and from 0.9 to 1.2 parts of the acetone from separate containers and through separate conduits then premixing them immediately prior to hydrolysis. It is necessary to limit the contact time in that if small amounts of water that are present in the acetone or in the atmosphere come in contact with the organohalosilane reactants, the water present will cause hydrolysis of the organohalosilane reactants generating acid which causes the acetone to polymerize. The initial hydrolysis medium prior to the introduction of the silane-acetone mixture contains from 0 to 4.1 parts of the acetone and preferably from 0.9 to 1.2 parts of the acetone and the amount of water, organic solvent and alcohol as set forth previously.

The products produced by this dual-feed method are among the preferred products produced by the methods of the present invention. They are preferred since they have shorter cure times. These preferred products can also be produced by a process in which the polymerization of acetone is prevented by the presence of carbon dioxide. This method comprises mixing carbon dioxide, 0.9 to 5 parts and preferably 0.9 to 1.2 parts of the acetone and the organohalosilane reactants and adding this to the hydrolysis bath set forth above containing from 0 to 4.1 parts of the acetone and amounts of water-immiscible organic solvent and alcohol within the ranges previously set forth above. The carbon dioxide is used in an amount sufficient to substantially saturate the acetone organohalosilane solution. Preferably, from 10 to 20 parts of carbon dioxide by weight based on the organohalosilane are employed when the carbon dioxide is used as a solid. Organohalosilanes which can be employed in the foregoing hydrolysis are silanes of the formula, (2)

$$R_aSiX_{4-a}$$

where R is defined the same as R 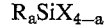, X is a halogen radical such as chloro, and $a$ is an integer having a value of 1 or 2.

In addition, as a reactant there may be utilized an aliphatic monohydric alcohol or an alkoxylated organohalosilane.

The definition of R in the above formula (1) is the same as that for $R^{10}$ given previously. Included by the organohalosilanes of formula (2) are, for example, methyltrichlorosilane, dimethyldichlorosilane, methylphenyldichlorosilane, phenyltrichlorosilane, diphenyldichlorosilane, cyanoethyltrichlorosilane, methylcyanopropyldichlorosilane and etc. As indicated above, any type of trifunctional chlorosilane and difunctional chlorosilane may be utilized in the Merrill process. that is, the process set forth in patent application Ser. No. 115,715, as well as in the previous process for forming silicone resins having therein, solely, trifunctional units and difunctional units. These silicone resins prepared in accordance with this process can preferably have from about 5% to about 12% by weight of hydroxyl radicals attached to silicon and from about 0% to about 4% of alkoxy radicals attached to silicon. These resins have been found to soften at temperatures as low as 60° C. and generally flow at temperatures at between 70 to 90° C. Thus, with such characteristics, such resins readily permit incorporation of the standard resin curing catalyst at temperatures below 100° C. Moreover, such resins will have flow temperatures above about 100° C. up to 150° C. and will cure at temperatures of 190° to 200° C. and above. When the silicone resin produced in accordance with the above process has an R to Si ratio of anywhere from 1.0 to 1.4 or 1.5, such a silicone resin has been found effective for making varnishes or paint formulations capable of imparting improved surface characteristics compared to prior art silicone resin varnishes or paints. Thus, it can readily be seen that such varnishes may simply be made by incorporating the silicone resin produced in accordance with the above process in one of the inert hydrocarbon solvents mentioned previously adding the proper catalyst to the solution and then utilizing the resulting solution as a varnish. Such a varnish or coating may be applied to whatever substrate it is desired and then the resulting coated object or coated substrate may then be placed in an oven maintained at temperatures above 200 C., so as to finally cure the coating so as to form a laminate or a coated object. With the stabilizing additive of the present case added to the solution, such varnishes or paints or solutions for coating objects may remain shelf stable for periods as long as 6 months or more irrespective of whether a catalyst is placed in the solution initially when the silicone resin organic solvent solution was formed or whether the catalyst is placed in the silicone resin organic solvent solution just prior to the application of the varnish on the object to be coated. Catalysts that may be incorporated into silicone resin solutions are for instance, dibutyltin-2-ethylhexaonate; bicarbonate; zinc octoate and other such types of catalyst and most preferably metal soap catalyst. Such solutions which are catalyzed with the above catalyst will be shelf stable for periods as long as 6 months or more if the stabilizing additive of the present invention is incorporated into such solutions. In addition, in such solutions there may be in addition to the curing catalyst there may be included fillers such as glass fibers, fused silica, asbestos, diatomaceous earth, mica and etc. A proportion of up to 200% by weight of the resin of such fillers can be employed. Such fillers are not normally included in coating compositions but if it is desired to incorporate such fillers in such a solution they may be so incorporated. With a stabilizing additive added to such solutions the resulting solution will have a shelf stability of 6 months or more.

The catalysts that are normally added to the solutions of the present invention in addition to the stabilizing additive are known as metal soaps. Thus, such solutions with metal soap catalysts in them and the stabilizing additive of the present case can be stored for periods as long as 6 months or more without gelling and without any noticeable curing or partial curing of the silicone resin dissolved in such solutions.

Other metal soap catalysts that may be utilized in solutions of the present invention are tin resinoleate, or cobalt naphthenate. In addition, metal soaps of acid radicals such as of the acid radicals of the resinoleate, stearate, oleate as well as the lower radicals such as acetate, butyrate, octoate and others may be utilized to form the desired metal soaps which may be incorporated as catalysts in the shelf stable solutions of the present case.

The metal ion of the metal salts can be one selected from the class consisting of lead, tin, zirconium, antimony, iron, cadmium, barium, calcium, titanium, bismuth and manganese. Thus, examples of suitable metallic soap catalysts are tin naphthenate, lead octoate, tin octoate, iron stearate, tin oleate, antimony octoate, tin butyrate, basic dibutyltinlaurate and dibutyl tin dilaurate. The tin and lead metal salts are preferred as catalysts in the solutions of the present invention since they are usually more soluble in the inert hydrocarbon solvents. Generally, up to 10% by weight of the silicone resin in solution may be added of the metal soap as a catalyst and such concertration of catalyst in the solution will not deleteriously effect the shelf stability of the solution in the presence of the stabilizing additive of the present case. More preferably, there is utilized 0.1 to 5% by weight of the metal soap based on the weight of the silicone resin in solution and such catalyzed solution will remain shelf stable for periods as long as 6 months or more.

The present stabilizing additive as identified above, is especially suitable for silicone resins as identified previously and particularly with respect to the silicone resins containing only trifunctional and difunctional units in the silicone resin structure irrespective of the hydroxyl content of the silicone resin. The stabilizing additive of the present case is especially desirable for the case where the silicone resin composed of trifunctional units and difunctional units is unstable in solution even in the absence of a catalyst, as is the case with the silicone resin composed of trifunctional units and difunctional units produced by the process first set forth in the present specification. However, it is not intended to limit this stabilizing additive of the present case for imparting shelf stability to a silicone resin solution to only silicone resins containing trifunctional units and difunctional units. The stabilizing additive of the present case will also operate and work to stabilize silicone resin solutions where the silicone resin is composed of only monofunctional units and tetrafunctional units or is composed only of monfunctional units, tetrafunctional units and difunctional units. Thus, the silicone resin which will be self stable in solution with or without catalysts in the presence of the stabilizing additive of the present case is a silicone resin composed of $R_3SiO_{1/2}$ monovalent units and $SiO_2$ tetravalent units where the ratio of the monovalent units to the tetravalent units is generally from 0.25–075:1 to preferably 0.65–0.70:1.

Another type of silicone resin that may be stabilized in solution with or without the presence of a catalyst in the presence of the stabilizing additive of the present invention is a silicone resin comprising $R_3SiO_{1/2}$ monovalent units, $SiO_2$ tetravalent units and $R_2SiO$ divalent units where the ratio of the monovalent units to the tetravalent units to the divalent units varies generally from 0.25–0.75:1 to 0.05–0.1, and preferably 0.65–0.7:1 to 0.05–0.07. Such silicone resins if not treated subsequently may have a silanol content of 3 to 5% by weight or in the alternative if they have been treated may have a silanol content of less than 0.5 weight percent or less. The R radical in the above formulation of the monofunctional, tetrafunctional and difunctional units present in the above silicone resins have the same definition as $R^{10}$ which was defined previously. Most preferably, R is a lower alkyl or lower alkenyl radical of up to 8 carbon atoms.

The above resins may be prepared under one method by reacting silica hydrosol with compounds of the formulas

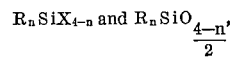

or with compounds of the formula

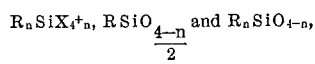

where the R radicals have the same definition as $R^{10}$ that was defined previously, X is a halogen and $n$ has a value of 2 to 3.

The silica hydrosols employed are prepared in the usual manner by neutralizing sodium sillicate solutions. This neutralization may be carried out either by employing an acid or a chlorosilane. In the latter case, it is not necessary to add any additional acid to the reaction mixture since the silica hydrosol at any temperature would react with the above defined organosilicon compounds under acid conditions. It is preferred that the sol have a concentration of 1 to 35% by weight of $SiO_2$. The silanes and siloxanes may be employed individually or in a mixture. In such cases, the chlorosilane mty be added directly to the sodium silicate solution. In the case where alkoxy silanes are employed, it is necessary that the silica hydrosol contain sufficient acid so that the pH of the reaction mixture will be less than 5. Suitable acids are hydrochloric, sulfuric, nitric, phosphoric, benzene, sulfonic, trichloroacetic or any other type of strong acid. Any amount of excess acid other than that which is necessary to lower the pH below 5 may be employed.

Any of the large groups of compounds within the above formulas may be used to prepare these silicone resins composed of monofunctional and tetrafunctional units and optionally even of difunctional units. Specific examples of individual compounds which are satisfactory are trimethylchlorosilane, trimethylethoxysilane, trimethylisopropoxysilane, phenyldimethyldichlorosilane, hexamethyldisiloxane, dimethylsiloxane, phenyltrichlorosilane, diethyltetramethyldisiloxane, tolylmethyldichlorosilane, methyltriethoxysilane, stearyltrichlorosilane, chlorophenyldimethylchlorosilane, monotolyltrichlorosilane and trifluorotolylmethyldichlorosilane.

The silica hydrosol is simly mixed with the silanes and/or siloxanes to form the required silicone resin. As mentioned previously, a strong acid is added to lower the pH to below 5, if a chlorosilane is not involved in the reaction. It has been found that the reaction between silica hydrosol silanes or siloxanes proceeds rapidly at 30° C. or above to produce the copolymeric siloxanes. During the reaction the mixture is preferably thoroughly agitated. Then an emulsion forms which separates into two layers upon standing. The layers are then separated and the organosilicon layer washed free of acid with water which separates out of an aqueous layer and thus is removed. The organosilicon layer is then dried to yield the silicone resin product. More specific details as to this process can be found in Daudt et al., U.S. Pat. 1,676,182, which disclosure is hereby incorporated into the present application by reference, or by the disclosure of Simoneau et al., Ser. No. 88,472, filed Nov. 10, 1970.

Another method for producing these resins composed of monofunctional and tetrafunctional and difunctional units comprises the cohydrolysis of compounds having the formula $R_nSiX_{4-n}$, where R has the same definition as R¹⁰ that was given previously, X represents a haolgen atom preferably chlorine and $n$ varies from 2 to 3. The above halogen compounds are reacted with tetrachlorosilane to provide the desired resins. A solution of the halogen silanes in an inert non-alcoholic organic solvent is formed in which the organic solvent is insoluble or substantially insoluble in water and is selected from the class consisting of (1) aliphatic and aromatic liquid hydrocarbons and (2) liquid ethers containing at least 4 carbon atoms. This solution is gradually added to a two-phase hydrolysis medium comprising a mixture of water in an amount considerably in excess of that calculated as necessary to hydrolyze the silane and a liquid aliphatic alcohol which is not completely soluble in water but which dissolves in an appreciable amount of water. Alcohols that are suitable are n-butanol, isobutyl alcohol, n-amyl alcohol, secondary amyl alcohol, isoamyl alcohol, tertiary amyl alcohol, n-hexenyl, methylisobutylcarbonyl, 2-ethylbutylcarbonyl and methylamylcarbonyl. In addition to toluene and xylene which are the preferred non-alcoholic solvents for the silane derivatives, benzene and various saturated or substantially saturated hydrocarbon fractions boiling between 75° C. and 250° C. such as n-heptane, benzene, hydrogen and kerosene can be used. The halosilanes dissolvent in the solvent are added to the mixture of water and the alcohol. The mixture is vigorously stirred during the reaction which is exothermic. After the reaction has proceeded to completion, the agitation is discontinued and the reaction mixture allowed to separate into two layers. The lower aqueous layer is removed and the organic layer is washed with water and then filtered. The resulting organic mixture is the silane resin mixture that may be utilized in accordance with the present invention.

A more complete description of the above process is explained in Sauer, U.S. Pat. 2,398,672 whose disclosure is hereby incorporated into the present case by reference.

A silane resin product obtained by the above process generally has 3.0 to 5.0% by weight of hydroxyl groups. It has been discovered that the hydroxyl content of such silicone resins may be reduced to less than 3.0% by weight to less than 0.5% by weight by adding potassium or sodium hydroxide to the resin as dissolved in the solvent in which it is made and heating the resulting solution to the reflux of the solvent which may be anywhere from 115 to 120° C. for toluene, and 140° to 145° C. for xylene. About 200 to 600 parts per million of the alkaline metal hydroxide silicone resin solids. Under these conditions, the silicone resin as produced by the above process is treated so as to condense out most of the silanol groups in the silicone resin and result in a silicone resin having either monofunctional units and tetrafunctional units or monofunctional units, tetrafunctional units, and difunctional units and having also a hydroxyl content of less than 3.0% by weight or in fact less than 0.5% by weight.

Thus, it is seen that with the stabilizing additive of the present invention any silicone resin and more particularly the silicone resins identified above can be stabilized in solution with or without the presence of a catalyst by adding the stabilizing additive of the present case in the required concentration range. More specifically and even more preferably, the silicone resin solutions wherein the silicone resin is dissolved at any concentration in one of the inert hydrocarbon solvents identified previously, may be stabilized with or without the presence of a catalyst so that it does not gel and has a shelf stability for a period of 6 months or more by the addition of the stabilizing additive of the present case at the required concentration and wherein the silicone resin is comprised of trifunctional units and difunctional units. Such a silicone resin solution which is stabilized with a stabilizing additive of the present case may even be heated to elevated temperatures as high as 100° C. and even higher without the gellation of the silicone resin solution.

The following examples are presented for the purpose of illustrating the invention and not for any other purpose such as specifically limiting the invention. All parts are by weight in the examples.

Example 1

There is charged to a flask equipped with an agitator, thermometer, condenser and silane addition tube 187 parts of water. A silane blend consisting of 30.5 parts of methyltrichlorosilane, 220 parts of phenyltrichlorosilane, and 87 parts of dimethyldichlorosilane and 202.5 parts of toluene is prepared and 100 parts of this mixture is taken and added to 187 parts of water under vigorous agitation. The addition rate is controlled for 30±5 minutes thus controlling the reaction temperature below 90° C. Following complete addition of the silane blend, 187 parts of toluene is added to the mixture in the flask. Agitation is continued for 15±5 minutes. The agitation is then stopped and the mixture is allowed to settle. Two phases are formed. The lower acid water layer is drawn off and discarded. Two parts of water is then added then added to the resin layer as a stabilizer. The water is then removed by heating the resin to reflux and stripping off the water. Following the removal of the water, 1% of Filtrol, which is an acid-treated clay and manufactured by Filtrol Corporation, is added and the solvent is stripped off at 170° C. for bodying of the resin. The bodying is accomplished in 4 to 6 hours and the viscosity is controlled at 400 to 600 centipoise with a Zahn cup viscometer. The resin is then cut with 16 parts of toluene and filtered. The final step is adjusting the solids to 60% solids concentration in toluene. The R is Si ratio of the resin produced is 1.36:1 and the resin is composed of $(CH_3)SiO_{3/2}$ units, $C_6H_5SiO_{3/2}$ units, and $(CH_3)_2SiO$ units. The hydroxyl content of the resin is about 0.5% by weight. A sample of the resin solution at 60% solids in toluene is taken and it is found to gel upon standing completely after a 2-month period. Another sample of the resin solution was taken and to it there was added 5% by weight of the resin solids of butyl Cellosolve. The sample was placed in a 50° centigrade shelf life oven and after 8 months the viscosity was found to be unchanged and the resin solution had not gelled in any respect. There was also taken another sample of the same resin, 60% resin solid solution, and it was it was also placed in the 50° centigrade accelerated shaft life oven which sample did not contain in it any stabilizing additive of the present invention. Such a resin solution completely gelled in 2 months.

Example 2

A sample of the resin of Example 1 was taken and it was cut with toluene so it contained the silicone resin of Example 1 at 50% solids in toluene. To this sample there was added .06% by weight of iron, based on the resin solids, from 6% by weight of iron octoate solution. The resulting solution was stabilized with 5% by weight of butyl Cellosolve based on the resin solids. A second sample of the resin of Example 1 was also segregated and cut with toluene so that it was a 50% silicone resin solids. This second sample was also catalyzed with .06% by weight based on the resin solids of iron from a 6% by weight of iron octoate solution. Both samples were placed in a 50° C. accelerated shelf life oven. The sample without the butyl Cellosolve gelled in 16 hours. The stabilized sample was continuously checked over a 6-month period. No change in viscosity or gelling of the silicone resin in solution was noted of the stabilized sample. The stabilized sample was then taken and a coating applied to glass fibers and the resulting coating was cured at 200° C. in a period of 10 minutes. It was found that under such elevated temperatures that the stabilized sample of the silicone resin solution cured at the same rate as the cure rate of the silicon resin of Example 1 which is taken immediately after preparation and cured to form a coating on glass tape without any storage or shelf life period prior to the cure.

Example 3

There is charged to a flask equipped with an agitator, thermometer, condenser and silane addition tube 900 parts of toluene, 500 parts of acetone and 3000 parts of water. A silane blend consisting of 358 parts of methyltrichlorosilane, 507 parts of phenyltrichlorosilane and 135 parts of diphenyldichlorosilane is added in a dual feed with 500 parts of acetone through a common addition tube to the mixture in the flask with good agitation. The addition rate is controlled for 30–40 minutes thus controlling the reaction temperature below 40° C. with the aid of external cooling. Following complete addition of the silane blend the agitation is continued for 15±5 minutes. The agitation is then stopped and the mixture is allowed to settle. Two phases are formed. The lower acid water layer is drawn off and discarded. The excess solvent is atmospherically stripped off to 140° C. and approximately 87% solids. Following the removal of the solvent, 1% of Filtrol #1 which is an acid treated clay and manufactured by Filtrol Corporation is added and the resin is bodied at 140° C. The bodying is accomplished in 2–4 hours and the viscosity is controlled at 100–200 centipoise with a Zahn cup viscometer. The resin is then cut with toluene to approximately 60% solids and filtered. The final step is adjusting the solids to 50% with toluene and the addition of .003% of resin in the form of iron octoate catalyst. The R to Si ratio of the resin produced is 1.1–1 and the resin is composed of $(CH_3)SiO_{3/2}$ units, $$C_6H_5SiO_{3/2}$$

units, and $(C_6H_5)_2SiO$ units. The hydroxyl content of the resin is about 0.5% by weight. A sample of the resin having a viscosity of 60 centipoise at 25° C. was placed in a 50° centigrade shelf life oven and after two weeks was found to be gelled. Another sample was taken and to it was added 5% by weight of the resin solids of $$C_4H_9OCH_2CH_2OCH_2\overset{\underset{\displaystyle CH_3}{|}}{C}HOH.$$

The sample was placed in a 50° centigrade shelf life oven and after 6 months the viscosity was found to be unchanged and the resin solution had not gelled in any respect.

Example 4

A sample of the resin of Example 5 was taken and there was added 5% by weight of the resin solids of $C_6H_{13}$. The sample was placed in a 50° centigrade shelf life oven and after 6 aonths the viscosity was found to be unchanged and the resin solution had not gelled in any respect.

We claim:

1. A process for stabilizing a solution of a silicone resin comprising adding to said solution 5 to 20% based on the weight of the resin solid of a stabilizing additive of the formula, $$R^{10}OGOH$$

where $R^{10}$ is selected from the class of monovalent hydrocarbon radicals and halogenated monovalent hydrocarbon radicals of up to 15 carbon atoms, G is selected from the class consisting of $$-R^{11}-, -\overset{\underset{\displaystyle (R^{15})_y}{|}}{\underset{\displaystyle }{R^{12}}}-, -\overset{(R^{13})_x}{\underset{\displaystyle }{R^{14}}}-,$$

wherein $R^{11}$, $R^{12}$ and $R^{14}$ are selected from the class consisting of divalent hydrocarbon radicals, divalent hydrocarboxyhydrocarbon radicals and halogenated divalent hydrocarbon radicals of 1 to 20 carbon atoms, $R^{13}$, $R^{15}$ are selected from monovalent hydrocarbon radicals and halogenated monovalent hydrocarbon radicals of 1 to 8 carbon atoms and x, y are whole numbers that vary from 1 to 5.

2. The process of Claim 1 wherein $R^{10}$ is lower alkyl of 1 to 8 carbon atoms and G is $-R^{11}-$ wherein $-R^{11}-$ is lower alkylene of 1 to 8 carbon atoms.

3. The process of Claim 1 wherein said stabilizing additive has the formula, $$C_4H_9OCH_2CH_2OH$$

4. The process of Claim 1 wherein there is a catalyst in said solution.

5. The process of Claim 1 wherein the solvent in said solution is selected from the class consisting of aromatic hydrocarbon solvents, aliphatic hydrocarbon solvents, ether solvents and ester solvents.

6. The process of Claim 5 wherein the solvent is selected from the class conisting of benzene, toluene, xylene, butyl acetate, acetate and diethylether.

7. The process of Claim 1 wherein the silicone resin comprises $RSiO_{3/2}$ units and $R_2SiO$ units, where the R to Si ratio may vary from 1.0 to 1.9 and the silanol content of the resin may vary from 0.5 to 12% by weight and R is selected from the class consisting of monovalent hydrocarbon radicals, halogenated monovalent hydrocarbon radicals and cyanoalkyl radicals.

8. The process of Claim 1 wherein the silicone resin comprises $R_3SiO_{1/2}$ monofunctional units and $SiO_2$ tetrafunctional units wherein the ratio of the monofunctional units to the tetrafunctional units being from 0.25–0.75, with 0.1 to 5.0% by weight of hydroxyl groups where R is selected from the class consisting of monovalent hydrocarbon radicals, halogenated monovalent hydrocarbon radicals and cyanoalkyl radicals.

9. The process of Claim 1 wherein the silicone resin comprises $R_3SiO_{1/2}$ monofunctional units, $SiO_2$ tetrafunctional units and $R_2SiO_2$ difunctional units with the ratio of the monovalent units to tetravalent units to divalent units being from 0.25–0.75:1 to 0.05–0.1 with a hydroxyl content of 0.1–5% by weight and wherein R is a radical selected from the class consisting of monovalent hydrocarbon radicals, halogenated monovalent hydrocarbon radicals and cyanoalkyl radicals.

10. A shelf stable silicone resin solution comprising solvent present at a concentration of 5 to 95% by weight based on the solution, a silicone resin present at a concentration of 5 to 95% by weight based on the solution, and a stabilizing additive which is present at a concentration of 5 to 20% by weight based on the silicone resin solid of the formula, $$R^{10}\ OGOH$$

where $R^{10}$ is selected from the class consisting of monovalent hydrocarbon radicals and halogenated monovalent hydrocarbon radicals of up to 5 carbon atoms, G is selected from the class consisting of $$-R^{11}-, -\overset{(R^{13})_x}{\underset{\displaystyle (R^{15})_y}{R^{12}}}-, -\overset{(R^{13})_x}{R^{14}}-,$$

wherein $R^{11}$, $R^{12}$ and $R^{14}$ selected from the class consisting of divalent hydrocarbon radicals, divalent hydrocarboxyhydrocarbon radicals, and halogenated divalent hydrocarbon radicals of 1 to 20 carbon atoms, $R^{13}$, $R^{15}$ are selected from monovalent hydrocarbon radicals and halogenated monovalent hydrocarbon radicals of 1 to 8 carbon atoms and x, y are whole numbers that vary from 1 to 5.

11. The solution of Claim 10 wherein there is present a metal soap catalyst at a concentration of 0.1 to 10% by weight of the silicone resin in solution.

12. The solution of Claim 10 wherein $R^{10}$ is lower alkyl of 1 to 8 carbon atoms and G is $-R^{11}-$ where $-R^{11}-$ is lower alkylene of 1 to 8 carbon atoms.

13. The solution of Claim 10 wherein said stabilizing additive has the formula, $$C_4H_9OCH_2CH_2OH$$

14. The solution of Claim 10 wherein the solvent in said solution is selected from the class consisting of aromatic hydrocarbon solvents, aliphatic hydrocarbon solvents, ether solvents and ester solvents.

15. The solution of Claim 14 wherein the solvent in said solution is selected from the class consisting of benzene, toluene, xylene, butyl acetate, ethyl acetate and diethylether.

16. The solution of Claim 10 wherein the silicone resin comprises $RSiO_{3/2}$ units where the R to Si ratio may vary from 1.0 to 1.9 and the silanol content of the resin may vary from 0.5 to 12% by weight and R is selected from the class consisting of monovalent hydrocarbon radicals, halogenated monovalent hydrocarbon radicals and cyanoalkyl radicals.

17. The solution of Claim 10 wherein the silicone resin comprises $R_3SiO_{1/2}$ monovalent units and $SiO_2$ tetravalent units wherein the ratio of the monovalent units to the tetravalent units being from 0.25 to 0.75 with 0.1 to 5.0% by weight of hydroxyl groups where R is selected from the class consisting of monovalent hydrocarbon radicals, halogenated monovalent hydrocarbon radicals and cyanoalkyl radicals.

18. The solution of Claim 10 wherein the silicone resin comprises $R_3SiO_{1/2}$ monofunctional units, $SiO_2$ tetrafunctional units, and $R_2SiO_2$ difunctional units with the ratio of the monofunctional units to tetrafunctional units, to difunctional units being from 0.25–0.75:1 to 0.05 to 0.1 and the resin has a hydroxyl content of 0.1 to 5% by weight and wherein R is a radical selected from the class consisting of monovalent hydrocarbon radicals, halogenated monovalent hydrocarbon radicals and cyanoalkyl radicals.

References Cited
UNITED STATES PATENTS

| | | | |
|---|---|---|---|
| 3,667,997 | 7/1972 | Kaiser et al. | 260—33.2 SB |
| 3,661,817 | 5/1972 | Hamilton et al. | 260—33.2 B X |

LEWIS T. JACOBS, Primary Examiner

U.S. Cl. X.R.

260—33.2 SB, 33.6 SB